Feb. 12, 1963
C. D. FISHER
3,077,365
PNEUMATIC CONVEYING SYSTEM
Filed Jan. 22, 1959
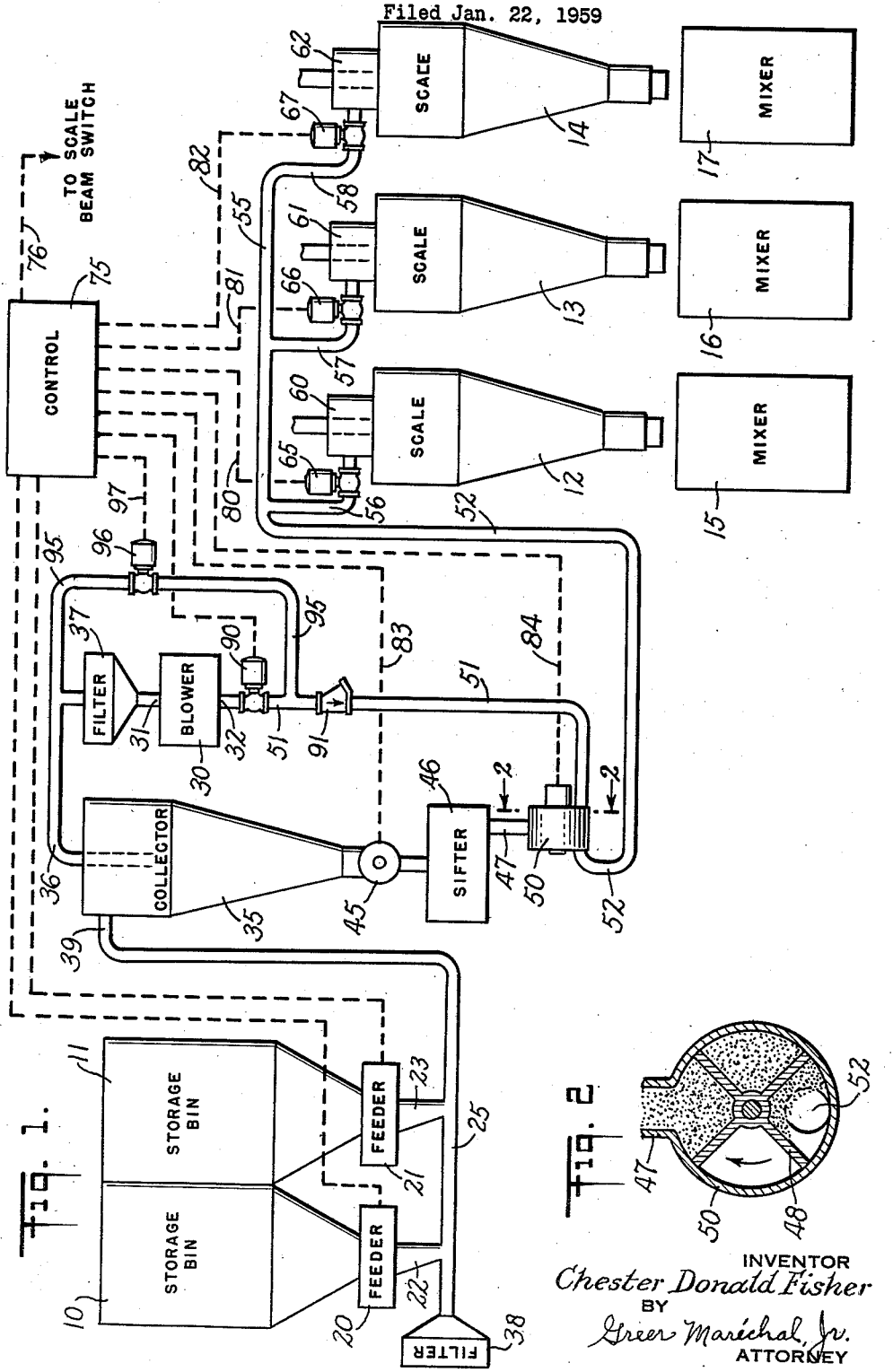
INVENTOR
Chester Donald Fisher
BY
Greer Maréchal, Jr.
ATTORNEY 3,077,365
PNEUMATIC CONVEYING SYSTEM
Chester Donald Fisher, Muncy, Pa., assignor to Sprout, Waldron & Company, Inc., Muncy, Pa., a corporation of Pennsylvania
Filed Jan. 22, 1959, Ser. No. 788,295
13 Claims. (Cl. 302—28)

This invention relates to pneumatic handling and conveying and feeding of pulverous materials and, more particularly, to a pneumatic system for the conveying and handling and mixing of a plurality of different pulverous materials such as flour and the like from a plurality of storage bins through an automatic conveying system to one or more batching scales, and including quick cut-off means for immediately stopping and interrupting the flow of material to any one of the scales upon satisfaction thereof.

In the automatic weighing, batching, and conveying of various pulverous materials such as flour and the like, particularly in bakeries and like establishments, it may be advantageous or desired to have several kinds of flour automatically conveyed according to a predetermined proportioning to automatic batching scales for weighing out a particular amount of the predetermined proportioned mixture for introduction to automatic mixers as a first step in the subsequent baking or other processing. Similarly, particularly with materials such as flour to be manufactured into foodstuffs, it may be advantageous or desired to have the materials conveyed to and through the batching scales in a closed system by pneumatic conveying means to avoid contamination which otherwise might occur.

Furthermore, as will be understood, it may be that a particular proportioning of different kinds of flour or like materials may be desired for one scaled batch, whereas a different proportioning may be desired for the subsequent scaled batch. In installations where the storage bins for the raw materials may be remote (particularly in terms of running feet of conveying line) from the batching scale, a substantial proportion or accumulation of a mixed batch of material of one batch may be left in the conveying lines after the first batching scale is satisfied and/or remain for blowing off to a waste bin where a heterogeneous mixture of material may build up.

If the foregoing disadvantages are attempted to be alleviated by emptying the conveying lines (or merely deflecting the flow of material from the scales), after satisfaction of the first scale, into a general reservoir prior to commencing the second batching, a more or less heterogeneous mass of material will gradually be accumulated in such reservoir necessitating later disposition or use. Similarly, if quick cut-off means in a pneumatic conveying system are attempted to be devised to stop instantaneously upon satisfaction of the first scale, certain difficulties may be experienced in halting the flow of air through the system and/or, perhaps more emphatically, in attempting to re-start the pneumatic conveying air after the first batch is satisfied. That is, as will be understood, with pneumatic conveying systems, a substantially instantaneous starting and stopping of the pneumatic flow may not be practicable since the pneumatic flow, and particularly starting and stopping thereof, may not be a direct function of starting and stopping of the blower providing the pneumatic conveying air for the system. Also, as will be understood, given a pneumatic conveying system powered by a blower (whether the system is a negative pressure or suction variety or a positive pressure forced draft variety) merely cutting off the flow of material through the system as by valves, etc., may give rise to difficulties from pressure build-up or packing on one side or the other of the valve where flow of material is interrupted apart from or without concomitant interruption of the pneumatic conveying air and/or blower source thereof, or the material being conveyed may settle or pack (particularly in vertical section of conduit) upon stopping of the air flow.

According to this invention, however, a system is provided for the positive mixing of a plurality of pulverant materials into a pneumatic conveying system according to any predetermined proportioning of the materials desired and the pneumatic conveying of such mixture to any one of a plurality of batching scales for weighing thereby, and including quick cut-off and quick by-passing means automatically controlled in response to the satisfaction of the batching scale for the virtually immediate interruption of further feeding or conveying of said mixture toward the scale as well as for by-passing of the pneumatic conveying supply of air and disposition or other relief of or from the system after satisfaction of the scaled batch of material therein prior to providing a subsequent batch or mixture of material of the same or different proportioning. Also a system according to this invention includes means and methods for accomplishing the foregoing advantages with a minimum of operator attendance and a maximum of automation.

One object of this invention is to provide, in a pneumatic conveying system of the character described, a system and apparatus for positively withdrawing and proportioning of a plurality of pulverous materials from a plurality of storage sources thereof and for pneumatically conveying these materials to a batching scale for the weighing thereof, and including means at said batching scale and in said pneumatic conveying system for positively and substantially immediately cutting off further flow of material through said system upon satisfaction of said batching scale and for readying said system substantially immediately for a further batching of said materials in a different proportioning.

Another object of this invention is to provide, in a pneumatic conveying and automatic proportioning and weighing system of the character described, means for receiving a positively proportioned mixture of the materials and for pneumatically conveying said mixture to a batching scale, and also including means whereby, upon satisfaction of the scale, flow of material is cut off, rather than deflected to another container, and the foregoing is accomplished without interruption of the source of pneumatic conveying air and/or excessive pressure build-up in the system, as well as without fouling the system for continued or subsequent operation on the subsequent batch of a different mixture.

A further object of this invention is to provide a system and apparatus for pneumatically conveying a previously proportioned mixture of pulverous material to a batching scale and for providing substantially immediate cut-off means for interrupting the flow of materials to the scale upon satisfaction thereof without retaining in such system and apparatus a substantial amount of the previously proportioned mixture of pulverous materials as would contaminate an additional batch of a differently proportioned mixture of pulverous materials handled by the system and apparatus.

Still another object of this invention is to provide a completely automated system and apparatus for the predetermined proportioned mixture of a plurality of pulverous materials and the pneumatic conveying of the mixture to automatic batching scales, which system and apparatus includes an arrangement for the substantially immediate interruption of the flow of the mixture of materials to the batching scales upon satisfaction thereof and, also, without retaining in the system an undesirably large residuum of one mixture of materials as might contaminate or disrupt the particular proportioning of a subsequent batch or different mixture of materials to be conveyed to the scales.

Other objects and advantages of this invention will be apparent from the following description, the accompanying drawing, and the appended claims.

In the drawing:

FIG. 1 illustrates, more or less diagrammatically or schematically, a flow sheet diagram indicating the several elements of apparatus, and the flow therethrough, of a system embodying and for practicing this invention, and FIG. 2 illustrates, more or less diagrammatically, a cross-section through the airlock feeder as disclosed as a part of a system embodying and for practicing this invention.

Referring to the drawing, FIG. 1 shows a layout or system for use in an automated bakery or the like for the handling of several different kinds of flour or like pulverous materials, and including storage bins 10 and 11 for initially storing the flours or other materials to be mixed and handled prior to the introduction thereof in the system and automatic batching scales 12–14 to which the mixture of materials is to be fed or conveyed, each batching scale delivering a weighed amount of mixture to its respective mixer 15–17 for further processing in the baking or other operation being carried out. It will be understood that batching scales 12–14 are devices of known construction for the automatic weighing of a batch of pulverous material introduced thereinto and including means responsive to the in-balance point of a scale beam for activating a switch indicating satisfaction of the pre-set weight demanded by the scale, after which the contents of the scale are delivered to mixers 15–17 or other source—all in known manner.

At the bottom of storage bins 10 and 11, which are of conventional construction, are feeders 20 and 21, respectively, which may, conventionally, deliver a given quantity of pulverous materials from bins 10 and 11 through chutes 22 and 23 into conveyor line 25, it being understood that, by adjusting the motor drive means (not shown) of feeders 20 and 21 to a specific and/or different speed of rotation, a positive proportioning of the material from bin 10 with regard to the material from bin 11 will be provided in conveying line 25.

A blower, indicated at 30 as having an inlet or suction side 31 and an outlet or positive pressure side 32, provides the source of conveying power for the entire pneumatic conveying system. Thus, a cyclone separator collector tank 35 is provided with the axial outlet at the top 36 being connected to the inlet or suction side 31 of blower 30, preferably through a filter 37. Partial evacuation of collector tank 35 by blower 30 results in the suction or negative pressure conveying of the positively proportioned mixture of materials from bins 10 and 11 in line 25 into collecting tank 35 as being entrained in a stream of air in line 25 provided by air being sucked in through filter 38 into line 25 by the partial evacuation of collecting tank 35 by blower 30.

Since collecting tank 35 is, as noted, provided in the nature of a cyclone separator with the inlet 39 thereto from line 25 being tangentially arranged and with the evacuation of tank 35 occurring through an axial line 36, the mixture of material from line 25 is entrained in air, sucked into collecting tank 35, and there separated from the air stream and allowed to fall by gravity into the conical bottom portion of collecting tank 35. A rotary valve or airlock or feeder 45, of conventional construction like feeders 20 and 21 and comprising a rotating vaned rotor for receiving increments of pulverous material from the conical lower portion collector 35, is provided as an airlock to prevent upsurge of air through the bottom of tank 35. That is, upon rotation of rotary valve or feeder 45, pulverous material in tank 35 is fed, increment by increment between the rotating vanes of airlock 45, into a sifter 46, of conventional construction, for the sifting and screening and removal from the material of oversize particles, foreign matter, etc., therein.

The output of sifter 46, through line 47, is fed into a rotary airlock feeder 50, also of well known design and illustrated in more detail in FIG. 2 as comprising a motor driven rotor with blades 48 for receiving increments of sifted material from line 47 in the manner of a rotary valve between blades 48 and conveying such increments of material to the bottom or six o'clock position of the airlock where the material is delivered from between the blades of the rotor into a stream of air, for entrainment therein, as provided through airlock 50 from line 51, communicating with the outlet or pressure side 32 of blower 30, into line 52 forming the output conveying line of air-entrained material from airlock 50.

As will be understood from the foregoing, a plurality of different materials are mixed or blended or positively proportioned one to the other from bins 10 and 11 through the action of feeders 20 and 21, and the predetermined mixture delivered, through chutes 22 and 23, into line 25, through which the mixture is sucked or entrained in an air stream in line 25 by virtue of blower 30 and the suction side thereof producing a suction air stream in line 25 through collecting tank 35 and filter 38. The thus entrained, previously proportioned mixture of pulverous materials is pneumatically conveyed through line 25 into the tangential inlet 39 of collecting tank 35, where, by virtue of the cyclone separator design of collecting tank 35, the mixture of materials is separated from the air stream and falls, by gravity, into the conical bottom portion of tank 35, to be delivered positively and as admixed through rotary valve or feeder 45 into sifter 46 and, therefrom, through line 47 into airlock 50 where the thus sifted and delivered material is entrained in a positive pressure air stream entering airlock 50 through line 51 (from the pressure side 32 of blower 30) and conveyed thence through line 52.

Line 52 conducts the air-entrained material to a manifold indicated at 55 with depending branches 56–58, each of which leads from manifold 55 (preferably through a flexible connection not shown) to one of the automatic weighing scales 12–14 through a tangential inlet cyclone separator 60–62, respectively, at the top thereof. Interposed between manifold 55 and each of the scales 12–14 is a quick closing valve 65–67, respectively, for interrupting, more or less instantaneously, the flow of air-entrained pulverous material to the scale. Thus, with any one of valves 65–67 in open position, a mixture of pulverous material in line 52 is pneumatically conveyed entrained in a positive air pressure stream to the scales 12–14, being separated therein from the entraining air stream at cyclone separator 60–62 so that the air-entrained material can drop, in the manner of a cyclone separator, into the operative or weighing part of scales 12–14, in known manner, to be weighed thereby before delivery from the batching scales 12–14 into the respective mixers 15–17 or other appropriately following apparatus.

Upon the quick closing of any of the automatic closing valves 65–67, as will be understood, further delivery of material from line 52 to the batching scale is more or less instantaneously interrupted, operation of such quick closing valves being effected, in known manner, by a limit switch on the weighing beam of scales 12–14 so arranged, as in conventional apparatus, to close a contact when the scale beam reaches the balance point thereof, thereby actuating the quick closing of valve 65–67, preferably through a controller 75, as indicated by the dotted line 76 in the drawing to indicate an operative interconnection for actuation of valves 65–67 when scales 12–14 are satisfied with a particular pre-set weight at the moment the beams thereof reach the balance point. Similarly into control 75 are interconnected the valves 65–67 (as indicated by the dotted lines 80–82) as well as the controls of the drive means for rotary feeders 45 and 50 (as indicated by dotted lines 83 and 84) all for the purposes in operation to be described below.

Blower 30, which furnishes the more or less continuous pneumatic power output for the entire pneumatic conveying system, also is provided with a pressure relief valve 90 in line 51 leading from the pressure output side 32 of blower 30, and a one-way check valve 91 is similarly provided, oriented to pass air in the direction of the arrow adjacent thereto but not in the opposite direction. A bypass line 95 is provided leading from line 51 around to communicate with the inlet side 31 of blower 30, preferably beyond filter 37 leading thereto, and a quick opening valve 96 is provided in by-pass 95 and also operatively connected, as indicated by dotted line 97, with control 75. As will be noted, bypass 95 and quick opening valve 96 therein are both disposed or connected in line 51 leading from the pressure side 32 of blower 30 between pressure relief valve 90 and check valve 91.

With the foregoing arrangement, a mixture of predetermined proportions from bins 10 and 11 (the proportioning of which having been determined by the setting or relative rotational speed of feeders 20 and 21) is delivered through line 51, collector tank 35, sifter 46, airlock 50, and line 52 pneumatically to manifold 55 from which it enters any one of the scales 12–14, depending upon the open or closed position valves 65–67. When the balance beam of scales 12–14 reaches the pre-set balance position for the particular weight of material desired, a microswitch (not shown) is closed passing the "in balance" intelligence to control 75 through which the appropriate quick closing motor valve 65–67 is immediately closed, thus interrupting further deposition of delivery of material to the scale. At the same time, and, preferably, under the impetus of the same weighing beam intelligence, control 75 also effectuates stopping (in known manner) of the rotation of airlock 50 and rotary valve feeder 45, and also opens quick opening motor valve 96 in bypass 95 leading from line 51 (from the outlet or pressure side 32 of blower 30)) around to the inlet or suction side 31 of blower 30. Preferably, though optionally, the same intelligence to control 75 may also be arranged to stop feeders 20 and 21 (as indicated by dotted lines 97 indicating an electrical or operative connection between the motor drives of feeders 20 and 21 with control 75).

Thus, upon the weighing beam or balancing beam of any of the scales 12–14 reaching the balance point, a series of electrical or operative interconnections is instigated, all in known manner, whereby quick closing valves 65–67 are closed to interrupt further conveying of material to the scales 12–14 and, similarly, material feeders 21 and 22, as well as airlock 50 and rotary feeder 45, are similarly more or less instantaneously arrested in their operation to interrupt further feeding of the particular mixture of powdered materials into the system. Also, more or less simultaneously with the closing any of valves 65–67, quick opening valve 96 in bypass 95 is opened, thereby allowing the output of blower 30 to be deflected or bypassed from pressure line 51 around through bypass 95 to the inlet side of blower 30, preferably through filter 37.

Thus, blower 30 continues to operate, but the air-entraining or conveying stream is bypassed through line 95 without building up in the system a continued passage of material or excessive air pressure after the interruption of the flow of material occasioned by the closing of any one of valves 65–67. Preferably, and as a cautionary control measure, pressure relief valve 90, positioned between the pressure side 32 of blower 30 and the inlet to bypass 95 around blower 30, is provided to accommodate any untoward pressure build-ups during operation, and check valve 91 is also preferably provided to avoid back flow of either air pressure or materials in line 51 upon sudden closing of any one of the valves 65–67 and upon the cessation of operation of airlock 50, feeder 45, etc.

In situations where several batches of the same formulation (as proportioned by feeders 20 and 21) may successively be desired, it will be understood that no further adjustment of the system need obtain other than the reactivation of the entire system upon discharging by scale 12–14 of its weighed batch of mixture into mixers 15–17 or any other appropriately following apparatus as may be desired. In such cases, however, where the blending or proportioning of the several materials from bins 10 and 11 may be altered (as by altering the respective rotary feed controls of feeders 20 and 21), it may be that the blending of successive batches and/or the proportioning of the several materials therein might be appreciably altered by residuals of the previous batch of material. As will be understood, of course, in a system or apparatus embodying and for practicing this invention, the residuum of a prior batch of material is held to a minimum in transit in the various conveying lines between the original proportioning feeders 20 and 21 and the ultimate scales 12–14 and this residuum is further minimized if the feeders 20 and 21, as well as the intervening airlock feeders 45 and 50, are stopped more or less simultaneously on the closing of quick closing valve 65–67, so that the intervening residuum is only a matter of a few pounds of material which, considering a large commercial installation using 500 or 600 lbs. batches of flour, may, indeed, have little or no effect upon the proportioning of a subsequent batch of material.

Nevertheless, it may be preferred to provide, in a system of apparatus embodying and for practicing this invention, in the electrical or operative connections between, for example, proportioning feeders 20 and 21, through controller 75, a time delay arrangement, of known construction, whereby, upon re-starting the system after closing of the valves 60–65, an appreciable time delay (preferably and satisfactorily no more than 10 to 15 seconds), obtains between the closing of bypass valve 96 (which would occur upon reactivation of this system along with starting up of feeder 45 and airlock 50 and opening of either of one or another of the valve 65–67 leading to one of the scales 12–14) and prior to the time that proportioning feeders 20 and/or 21 are reactivated to feed additional material into conveying line 25. In this manner, the entire conveying system can be "blown out" to remove therefrom any residuum of material proportioned according to a previous batch, and prior to the time that a new mixture having new or different proportioning is interjected into the system from bins 10 and 11 through proportioning feeders 20 and 21.

As will be understood, according to the foregoing, the flow of air-entrained material is promptly and more or less immediately cut-off, upon the scales reaching the balance point thereof, and stopped throughout the system notwithstanding the continued operation of blower 30, the operation of which, of course, is not susceptible to instantaneous starting and stopping in a pneumatic conveying system of the character described. By the same token if too great a material-to-air ratio is maintained in the system, some difficulty may be experienced in arresting as immediately as may be desired the flow of the material without packing or otherwise clogging the lines with air-entrained material to an extent which might require either mechanical unclogging of the lines or lines of such large diameter as to be, from a commercial or economical or practical point of view, inadmissible. Preferably, in a system embodying and for praticing this invention, a preferred material-to-air ratio in the pneumatic conveying portions thereof is from about three pounds material to one pound of air to about twenty-five pounds material to one pound of air, satisfactory results having been obtained within such preferred ranges despite the sudden starting and stopping of the system under the action of a scale beam reaching the in-balance position and notwithstanding the well understood packing or clogging qualities of pulverous material such as flour in a pneumatic conveying system of closed design, and particularly with regard to re-starting or reactivating the system after having once been shut down by the action of the scales 12–14 reaching its demand position of in-balance on the weighing beam thereof.

As will be understood from the foregoing, of course, the quick cutoff means according to this invention are satisfactorily applicable to flour conveying systems in which but a single grade or type of flour is used and without blending several different kinds of flour, as well as with systems in which a blend of flour is mechanically or otherwise (other than pneumatically) conveyed to a sifter such as 46 and interjected through an airlock such as 50 for entrainment in a pneumatic conveying air stream in conduit 51. For example, a single type of flour (or a blend thereof) may be mechanically conveyed into the pneumatically conveying air stream 50, if desired, and without collector tank 35 or the blending of the flour and/or pneumatic suction conveying from storage bins 10 or 11. In such a case, if desired, flour is satisfactorily conveyed by any conventional means from a source thereof for entrainment into the air stream at airlock 50 but such airlock arrangement or equivalent is conventional and well-known apparatus. Should this be desired, as will be understood, the inlet 31 of blower 30 communicates directly with the atmosphere and without providing a suction pre-conveying function, and the flour is interjected for entrainment and pneumatic conveying to scales 12–14 into the air stream through an airlock 50.

Nevertheless, upon satisfaction of any of the scales 12–14, the same switch and control mechanism is actuated to operate the quick cutoff means, to close the appropriate valves 65–67 at the scale and to open bypass valve 96 for substantially immediately bypassing the pneumatic output of blower 30 and to divert such pneumatic flow to the atmosphere for substantially immediate interruption of pneumatic conveying of flour from the entraining device or airlock 50 toward the scales and before a pressure build-up occurs behind valves 65–67 as would activate blow-off valve 90.

Accordingly, as will be understood from the disclosure herein, a system and apparatus are provided whereby flour or other such pulverous material may be continuously and automatically and pneumatically conveyed from a source thereof to automatic batching scales, and in which the conveyed flow of flour from entrainment thereof into the air stream at 50 to the various batching scales 12–14 can be virtually instantaneously interrupted and arrested upon satisfaction of the batching scales when any one of them reaches the balance point thereof as predetermined in the setting of the batching scales, and this substantially instantaneous interruption is achieved by the quick cutoff as disclosed and notwithstanding an inevitable lag factor in the source 30 of pneumatic force, as well as without the continuing conveying of a stream of flour to be deflected from the batching scales to a remote reservoir for later use or distribution.

While the methods and forms of apparatus herein described constitute preferred embodiments of the invention, it is to be understood that the invention is not limited to these precise forms of method and apparatus, and that changes may be made therein without departing from the scope of the invention which is defined in the appended claims.

What is claimed is:

1. In a system for the automatic pneumatic conveying of a plurality of different flours and the like in a predetermined blend thereof from a plurality of sources of said flours to automatic batching scales, the combination which comprises a feeder at each of said sources of flour, means for introducing each of said plurality of flours into said conveying system according to said predetermined proportioning thereof, an airlock feeder for introducing said flour to a positive pressure pneumatic conveying conduit for the entraining thereof in an air stream, a blower for providing said pneumatic conveying force and in flow communication with said airlock feeder for providing said pressure therein for entraining flour in said air stream, conduit means for leading said entrained blend of flour from said airlock feeder to said batching scale, quick closing valve means in said conduit means and for interrupting the flow of entrained flour when said batching scale reaches the balance point thereof, bypass means for deflecting said output of said blower to the atmosphere, and quick opening valve means in said flow communication between said blower and said airlock feeder and responsive to the balance point of said batching scale for interrupting said pneumatic flow from said blower to said airlock feeder.

2. In a system for the automatic pneumatic conveying of a plurality of different flours and the like in a predetermined blend thereof from a plurality of sources of said flours to automatic batching scales, the combination which comprises a feeder at each of said sources of flour, conveying means communicating with said plurality of feeders and into which said feeders introduce flour, an airlock feeder for introducing said flour into a positive pressure pneumatic conveying conduit for the entraining thereof in a positive pressure air stream, a blower for providing said pneumatic conveying force, said blower being in flow communication with said airlock feeder for providing said positive pressure for entraining said flour in said positive air stream, conduit means for leading said entrained blend of flour from said airlock feeder to said batching scale, quick closing valve means at said batching scale for interrupting the flow of entrained flour thereto when said batching scale reaches the balance point thereof, bypass means for deflecting said output of said blower from said outlet side thereof to the atmosphere, and quick opening valve means in said flow communication between said outlet side of said blower and said airlock feeder and responsive to the balance point of said batching scale for interrupting said pneumatic flow from said blower to said airlock feeder.

3. In a system for the automatic pneumatic conveying of a plurality of different flours and the like in a predetermined blend thereof from a plurality of sources of said flours to automatic batching scales, the combination which comprises a feeder at each of said sources of flour, conveying means communicating with said plurality of feeders and into which said feeders introduce flour, a collecting tank into which said plurality of flours are conveyed by said conveying means for admixture therein, an airlock feeder outlet for said collecting tank for discharging the contents of said tank into a positive pressure pneumatic conveying conduit for the entraining of said discharged contents of said collecting tank in a positive pressure air stream, a blower for providing said pneumatic conveying force, conduit means for leading said entrained blend of flour from said airlock feeder to said batching scale, quick closing valve means at said batching scale for interrupting the flow of entrained flour thereto when said batching scale reaches the balance point thereof, additional valve means in said flow communication between said blower and said airlock feeder and responsive to the balance point of said batching scale for interrupting substantially instantaneously said pneumatic flow from said blower to said airlock feeder, and bypass means upstream of said additional valve means for deflecting said output of said blower to the atmosphere.

4. In a system for the automatic pneumatic conveying of a plurality of different flours and the like in a predetermined blend thereof from a plurality of sources of said flours to automatic batching scales, the combination which comprises a rotary valve feeder at each of said sources of flour, conveying means communicating with said plurality of feeders and into which said feeders introduce flour, means for individually controlling said feeders for introducing each of said plurality of flours into said conveying means according to said predetermined proportioning thereof, a collecting tank into which said plurality of flours are conveyed by said conveying means for admixture therein, an airlock feeder outlet for said collecting tank for discharging the contents of said tank into a positive pressure pneumatic conveying conduit for the entraining of said discharged contents of said collecting tank in a positive pressure air stream, a blower for providing said pneumatic conveying force, the outlet of said blower being in communication with said airlock feeder for providing said positive pressure for entraining said discharged contents of said collecting tank in said positive air stream, conduit means for leading said entrained blend of flour from said airlock feeder to said batching scale, quick cutoff valve means for interrupting the flow of entrained flour thereto when said batching scale reaches the balance point thereof, quick opening valve means in said flow communication between said outlet side of said blower and said airlock feeder and responsive to the balance point of said batching scale for interrupting said pneumatic flow from said blower to said airlock feeder, and bypass means upstream of said quick opening valve means for deflecting said output of said blower from said outlet side thereof to said inlet side thereof upon the activation of both said quick cutoff valve means and said quick opening valve means to interrupt the flow of entrained flour when said batching scale reaches the balance point thereof.

5. In a system for the automatic pneumatic conveying of a plurality of different flours and the like in a predetermined blend thereof from a plurality of sources of said flours to automatic batching scales, the combination which comprises a rotary valve feeder at each of said sources of flour, pneumatic conveying means communicating with said plurality of feeders and into which said feeders introduce flour, means for individually controlling said feeders for introducing each of said plurality of flours into said conveying means according to said predetermined proportioning thereof, a collecting tank into which said plurality of flours are conveyed by said pneumatic conveying means for admixture therein, said conveying means and said collecting tank being operated by negative pressure, a rotary valve airlock feeder outlet for said collecting tank for discharging the contents of said tank into a positive pressure pneumatic conveying conduit for the entraining of said discharged contents of said collecting tank in a positive pressure air stream, a blower for providing said pneumatic conveying force, the inlet side of said blower being in flow communication with said collecting tank for providing said negative pressure therein and the outlet of said blower being in communication with said airlock feeder for providing said positive pressure for entraining said discharged contents of said collecting tank in said positive air stream, conduit means for leading said entrained blend of flour from said airlock feeder to said batching scale, quick cutoff valve means at said batching scale for interrupting the flow of entrained flour thereto when said batching scale reaches the balance point thereof, quick acting valve means in said flow communication between said outlet side of said blower and said airlock feeder and responsive to the balance point of said batching scale for interrupting said pneumatic flow from said blower to said airlock feeder, and bypass means upstream of said quick acting valve means for deflecting said output of said blower from said outlet side thereof to said inlet side thereof upon the closing of both said quick cutoff and said quick acting valve means to interrupt the flow of entrained flour therethrough when said batching scale reaches the balance point thereof.

6. In a system for the automatic pneumatic conveying of a plurality of different flours and the like in a predetermined blend thereof from a plurality of sources of said flours to automatic batching scales, the combination which comprises a feeder at each of said sources of flour, means for introducing each of said plurality of flours into said conveying system according to said predetermined proportioning thereof, an airlock feeder for introducing said flour to a positive pressure pneumatic conveying conduit for the entraining thereof in an air stream, a blower for providing said pneumatic conveying force and in flow communication with said airlock feeder for providing said pressure therein for entraining flour in said air stream, conduit means for leading said entrained blend of flour from said airlock feeder to said batching scale, quick closing valve means in said conduit means and for interrupting the flow of entrained flour thereto when said batching scale reaches the balance point thereof, quick opening valve means in said flow communication between said blower and said airlock feeder and responsive to the balance point of said batching scale for interrupting said pneumatic flow from said blower to said airlock feeder, bypass means for deflecting said output of said blower to the atmosphere upon actuation of said quick opening valve means and time delay means for delaying the reactivation of said airlock feeder upon reactivation of said automatic and pneumatic conveying system for a predetermined time interval sufficient to empty said conduits of flour.

7. In a system for the automatic pneumatic conveying of a plurality of different flours and the like in a predetermined blend thereof from a plurality of sources of said flours to automatic batching scales, the combination which comprises a rotary valve feeder at each of said sources of flour, pneumatic conveying means communicating with said plurality of feeders and into which said feeders introduce flour, means for individually controlling said feeders for introducing each of said plurality of flours into said conveying means according to said predetermined proportioning thereof, a collecting tank into which said plurality of flours are conveyed by said pneumatic conveying means for admixture therein, said conveying means and said collecting tank being operated by negative pressure, a rotary valve airlock feeder outlet for said collecting tank for discharging the contents of said tank into a positive pressure pneumatic conveying conduit for the entraining of said discharged contents of said collecting tank in a positive pressure air stream, a blower for providing said pneumatic conveying force, the inlet side of said blower being in flow communication with said collecting tank for providing said negative pressure therein and the outlet of said blower being in communication with said airlock feeder for providing said positive pressure for entraining said discharge contents of said collecting tank in said positive air stream, conduit means for leading said entrained blend of flour from said airlock feeder to said batching scale, quick cutoff valve means at said batching scale for interrupting the flow of entrained flour thereto when said batching scale reaches the balance point thereof, additional valve means in said flow communication between said outlet side of said blower and said airlock feeder and responsive to the balance point of said batching scale for interrupting said pneumatic flow from said blower to said airlock feeder, bypass means upstream of said additional valve means for deflecting said output of said blower from said outlet side thereof to said inlet side thereof upon closing of both said quick cutoff and said additional valve means to interrupt the flow of entrained flour therethrough when said batching scale reached the balance point thereof, and time delay means for delaying the reactivation of said airlock feeder upon reactivation of said automatic and pneumatic conveying system for a predetermined time interval sufficient to empty said conduits of flour.

8. In a system for the pneumatic conveying of flour and the like from a source thereof to batching scales and the like and in which said flour is introduced from said source into a flour-conveying conduit in said pneumatic system, the combination which comprises a blower for providing pneumatic flow under pressure for entraining and conveying said flour through said flour-conveying conduit, conduit means for conducting the pneumatic output of said blower to said flour-conveying conduit, alternative pressure relief and bypass means for selectively conducting said pneumatic output of said blower to the atmosphere and avoiding flow of said output to said flour-conveying conduit, first valve means for said alternative pressure relief and bypass means for effecting said selective conducting of said blower output therethrough, quick closing valve means at said batching scales for interrupting the flow of entrained flour in said flour-conveying conduit to said batching scales when said batching scales reach the balance point thereof, and means for automatically operating said first valve means for said alternative pressure relief and bypass means substantially simultaneously with the closing of said quick closing valve means at said batching scales effecting said alternative conducting of the output of said blower to the atmosphere instead of to said flour-conveying conduit substantially instantaneously upon operation of said valves.

9. In a system for the pneumatic conveying of flour and the like from a source thereof to batching scales and the like and in which said flour is introduced from said source into a flour-conveying conduit in said pneumatic system through an airlock feeder, the combination which comprises a blower for providing pneumatic flow under pressure for entraining flour at said feeder and conveying said entrained flour pneumatically through said flour-conveying conduit to said batching scales, first conduit means for conducting the pneumatic output of said blower into said feeder and said flour-conveying conduit, alternative conduit means for conducting said pneumatic output of said blower to the atmosphere instead of to said feeder or said flour-conveying conduit, means including a normally closed quick opening valve in said alternative conduit means for controlling the flow of said pneumatic output of said blower selectively through said first conduit means when said quick opening valve is closed and through said alternative conduit means when said valve is open, a quick closing valve in said flour-conveying conduit adjacent said batching scales for interrupting flow of entrained flour to said batching scales upon closing of said valve, and means for opening said quick opening valve in said alternative conduit means substantially simultaneously with the closing of said quick closing valve adjacent said batching scales for the automatic and substantially instantaneous conducting of substantially the entire pneumatic output of said blower to the atmosphere instead of to said feeder and flour-conveying conduit upon satisfaction of said batching scales and closing of said quick closing valve thereat.

10. The apparatus as recited in claim 9 in which said alternative conduit means for said pneumatic output of said blower conducts substantially the entire said output back to the inlet side of said blower when said quick opening valve is in open position for avoiding substantially all pneumatic pressure flow to said feeder and said flour-conveying conduit.

11. Apparatus as recited in claim 9 which also includes one way check valve means in said first conduit between said blower and said feeder and downstream of said alternative conduit means preventing return flow of pneumatic pressure from said feeder and said flour-conveying conduit whereby substantially all pneumatic flow through said feeder and said flour-conveying conduit ceases upon opening of said quick opening valve and said selective conducting of said blower output through said alternative conduit means.

12. Apparatus as recited in claim 9 which also includes automatic means for stopping said feeder upon the closing of said quick closing valve and the opening of said quick opening valve.

13. Apparatus as recited in claim 12 including means for opening said quick closing valve and closing said quick opening valve and starting said feeder for reactivating pneumatic flow of flour through said flour-conveying conduit, and which also includes time delay means for delaying the starting of said feeder upon said reactivation of said flour flow for a predetermined time interval sufficient to void said flour-conveying conduit of flour therein before additional flour is introduced thereinto by said feeder.

References Cited in the file of this patent

UNITED STATES PATENTS

| 674,958 | Coffey | May 28, 1901 |
| 1,468,966 | Herington | Sept. 25, 1923 |
| 2,026,633 | Haworth | Jan. 7, 1936 |
| 2,572,862 | Israel | Oct. 30, 1951 |
| 2,645,409 | Lawler | July 14, 1953 |
| 2,688,517 | Riordan | Sept. 7, 1954 |
| 2,688,518 | Krenke | Sept. 7, 1954 |
| 2,795,463 | Weller | June 11, 1957 |
| 2,860,174 | Begley | Nov. 11, 1958 |
| 2,895,768 | Bray | July 21, 1959 |
| 2,903,301 | Pfening | Sept. 8, 1959 |
| 2,913,279 | Pfening | Nov. 17, 1959 |
| 2,918,330 | Pfening | Dec. 22, 1959 |